(12) United States Patent
Cheng et al.

(10) Patent No.: US 8,828,462 B2
(45) Date of Patent: Sep. 9, 2014

(54) METHOD FOR PREPARING A PROTEINACEOUS VEGETABLE FLAVOR ENHANCER

(75) Inventors: Taiben Cheng, Glendale Heights, IL (US); Dafne Diez de Medina, Naperville, IL (US)

(73) Assignee: Griffith Laboratories International, Inc., Alsip, IL (US)

( * ) Notice: Subject to any disclaimer, the term of this patent is extended or adjusted under 35 U.S.C. 154(b) by 0 days.

(21) Appl. No.: 13/106,517

(22) Filed: May 12, 2011

(65) Prior Publication Data
US 2012/0288587 A1   Nov. 15, 2012

(51) Int. Cl.
A23J 3/34 (2006.01)
A23L 1/227 (2006.01)
A23L 1/22 (2006.01)

(52) U.S. Cl.
CPC ............... *A23J 3/346* (2013.01); *A23L 1/227* (2013.01); *A23L 1/22091* (2013.01)
USPC .............................................. 426/52

(58) Field of Classification Search
CPC .......................................... A23J 3/34
USPC ............................................ 426/52
See application file for complete search history.

(56) References Cited

U.S. PATENT DOCUMENTS 2,536,171 A * 1/1951 Hall et al. .................. 435/68.1
6,024,990 A * 2/2000 Kofoed et al. ............... 426/44

OTHER PUBLICATIONS

Tanaka, H. et al. 1965. Enzymatic hydrolysis of yeast cell walls. J. Bacteriol. 89: 1570-1580.*
Yust, M. D. M. et al. J. Agric. Food Chem. 55: 6503-6508 (2007).*
Li, GH et al. J. Pept. Sci. 12: 509-514 (2006).*

* cited by examiner

*Primary Examiner* — Hamid R Badr
(74) *Attorney, Agent, or Firm* — Drinker Biddle & Reath LLP

(57) ABSTRACT

This invention includes a method of producing hydrolyzed vegetable protein from proteinaceous vegetable material using commercial enzymes and optimally also fresh baker's yeast as source of proteases and peptidases. The invention further includes a method of solubilizing and pasteurizing proteinaceous vegetable material.

8 Claims, 1 Drawing Sheet

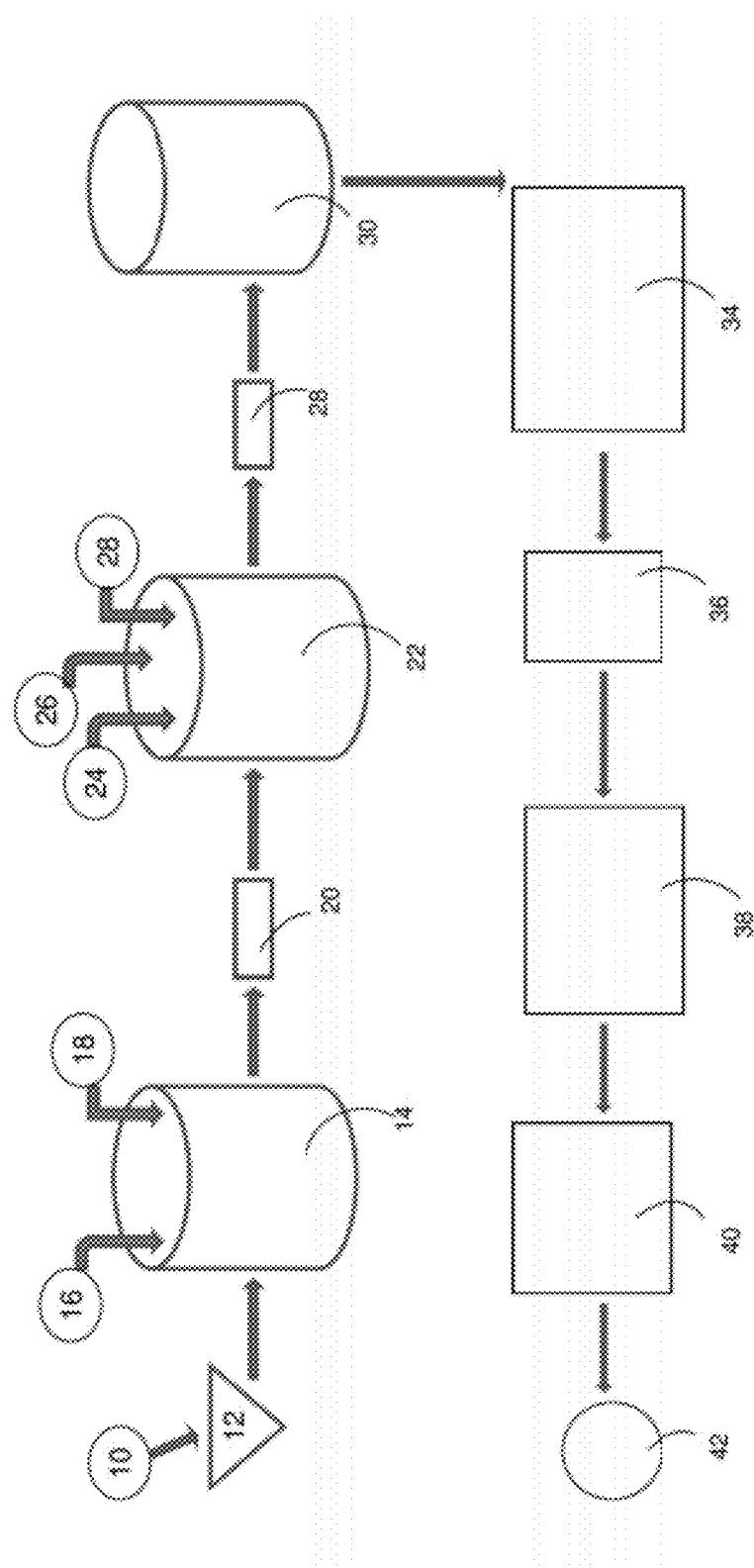

METHOD FOR PREPARING A PROTEINACEOUS VEGETABLE FLAVOR ENHANCER

BACKGROUND OF INVENTION

Vegetable materials rich in protein, such as oilseed cakes, cereal gluten and soy, are widely used as flavor enhancers in the preparation of dehydrated or liquid soups, sauces and seasonings. Such use requires that the proteinaceous material be hydrolyzed, whereby the plant proteins are degraded to absorbable amino acids and short peptides. Chemical methods are generally used to perform the hydrolysis. For example, the proteinaceous vegetable material can be hydrolyzed with concentrated hydrochloric acid, and the resulting hydrolyzate then neutralized with sodium hydroxide. Upon removal of insoluble fractions by filtration, the hydrolyzate is subjected to discoloration, concentration and/or drying, providing a material that can be used for flavoring or as a food additive.

Although easily implemented in industrial operations, this chemical hydrolysis process has particular limitations. Acidic hydrolysis causes partial or complete decomposition of some essential amino acids. Furthermore, during the acidic hydrolysis chlorinated by-products, such as chlorhydrins, may be formed, raising possible health concerns. As an additional issue, the use of sodium hydroxide to neutralize the acidic mixture leads to a high salt content in the final product, which may not be suitable for use in foods prepared for individuals seeking to minimize dietary salt intake.

In order to avoid the problems associated with chemical hydrolysis of proteinaceous vegetable material, there has been an increased interest in using enzymatic methods to perform the hydrolysis. To liberate as many amino acids as possible from the plant material, the enzymatic hydrolysis process employs either a complex mixture of endoproteases and exoproteases (International Patent Publication No. WO94/25580), or a combination of endoproteases and a broad-spectrum exoprotease (International Patent Publication No. WO98/27827).

However, enzymatic hydrolysis is not without drawbacks. For example, enzymatic reactions are generally not efficient, since they may lead to partial digestion of the proteinaceous material and low yields of free glutamate or MSG (monosodium glutamate), an amino acid that plays a key role in the perceived flavor of the hydrolyzate. Also, as a result of the partial digestion afforded by enzymatic reactions, larger peptides that can impart an unpleasant taste to the hydrolyzate may be formed.

The low efficiency of enzymatic hydrolysis of proteinaceous plant materials is primarily due to the high content of fiber and complex carbohydrates in the plant material. Carbohydrates, such as cellulose or glucans, form a rigid and stable network within the plant material, greatly reducing the exposure of the plant proteins to the proteases or peptidases. Therefore, in order to improve the enzymatic hydrolysis of plant-derived material, it is necessary to break down the carbohydrate network using fiber-hydrolyzing enzymes to increase the exposure of the plant proteins to the proteases and peptidases of the hydrolysis process.

In an effort to increase the efficiency of the enzymatic hydrolysis process, in the past microorganisms such as yeasts, bacteria and fungi have been added to the hydrolysis mixture. In this modified enzymatic process, the cell walls of the microorganisms in the reaction mixture are disrupted, causing the release of intracellular glutaminases and peptidases into the medium. The released enzymes then help hydrolyze the proteinaceous material, increasing the rate of the overall hydrolysis process.

Disruption of the cell walls of yeasts has been achieved by treating the microorganisms with volatile organic solvents (such as acetone or ethanol), or with quaternary ammonium salts or surfactants (see, for example, U.S. Pat. No. 2,536,171). However, this process requires the use of a large amount of yeast (in a ratio of 1.1:1 of yeast to proteinaceous material), which may adversely affect the flavor of the resulting hydrolyzate. Furthermore, the chemicals used in the disruption step may find their way into the final product, potentially compromising its purity and quality.

In an alternative approach, fiber-hydrolyzing enzymes, such as hemicellulase, have been used to hydrolyze the cell walls of the yeasts and cause release intracellular yeast enzymes into the reaction mixture. Unfortunately, this method affords only modest yields of glutamate in the final hydrolyzate (0.2%-2.1% w/w MSG). See, for example, U.S. Pat. No. 6,569,476.

Since enzymatic hydrolysis generally requires long contact times, there is the potential for putrefaction of the proteinaceous material by contaminating bacteria. One common strategy to prevent putrefaction or development of bacterial contamination is to pre-treat the reaction mixture with preservatives, such as sodium benzoate or sodium chloride. However, these preservatives not only affect the flavor of the final product, they also drastically increase its sodium content. Furthermore, the use of preservatives in the hydrolysis process may be unacceptable to consumers interested in "all-natural" products.

Alternatively, putrefaction may be avoided by autoclaving the proteinaceous material before hydrolysis. However, this results in heat destruction of nutritious components such as vitamins B, C and E and may also introduce an undesired flavor to the resulting material.

There is thus a need for a method that allows for efficient enzymatic hydrolysis of proteinaceous vegetable protein. Such a method should allow the preparation of a hydrolyzate with high glutamate and soluble peptide content, as well as a favorable flavor profile. There is also a need to identify a method to process proteinaceous vegetable material to minimize putrefaction and/or bacterial contamination during hydrolysis. The present invention addresses all of these needs.

BRIEF DESCRIPTION OF THE DRAWINGS

For the purpose of illustrating the invention, there is depicted in the drawing following certain embodiments of the invention. However, the invention is not limited to the precise arrangements and instrumentalities of the embodiments depicted.

FIG. 1 is a flow diagram illustrating a method for producing proteinaceous vegetable flavor enhancer products in accordance with the present invention.

DEFINITIONS

The definitions used in this application are for illustrative purposes and do not limit the scope used in the practice of the invention.

Unless defined otherwise, all technical and scientific terms used herein generally have the same meaning as commonly understood by one of ordinary skill in the art to which this invention belongs. Generally, the nomenclature used and the laboratory procedures in chemistry, analytical chemistry, and food chemistry are those well known and commonly employed in the art.

The articles "a" and "an" are used herein to refer to one or to more than one (i.e. to at least one) of the grammatical object of the article. By way of example, "an element" means one element or more than one element.

As used herein, the term "vegetable" means a plant-based material originated from a living organism of the Plantae kingdom. The term "vegetable" encompasses leaves, seeds, roots, tubers, bulbs, flowers, fruits, stems, shoots, nuts, and any combination thereof.

As used herein, the term "proteolytic activity" refers to enzymatic activity that leads to hydrolysis of peptide bonds.

As used herein, the term "fiber-hydrolyzing activity" refers to enzymatic activity that breaks down fiber material, such as but not limited to cellulose and glucans.

DETAILED DESCRIPTION OF INVENTION

In one aspect, the present invention is based on the unexpected discovery that hydrolyzed vegetable protein (HVP) may be prepared using commercial enzymes alone or preferably using combinations of commercial enzymes and fresh baker's yeast. When combinations of commercial enzymes and fresh baker's yeast are used, the ratio of yeast-to-protein should range from about 0.075:1 to about 0.75:1. These ratios afford higher yields of HVP in shorter periods of time, with up to 10% monosodium glutamate (MSG), as opposed to procedures that use commercially available proteases and peptidases only, wherein the maximum obtained value of MSG is about 5%. This novel method represents an unexpected improvement over known enzymatic methods that use a 1.1:1 yeast-to-protein ratio in the hydrolysis reaction, and which due to the use of a large amount of yeast, produce a final product that has a distinctive yeast flavor and relatively low amount of MSG (0.2%-2.1% w/w).

In another aspect, the present invention includes the unexpected discovery that proteinaceous material used in making HVP may be hydrolytically solubilized and pasteurized using a two-step method. According to this method, a first aqueous system comprising the vegetable material is provided. The first aqueous system is treated with at least one first protease and it is maintained at a temperature ranging from about 60° C. to about 75° C. for a period of time ranging from about 3 hours to about 6 hours, to generate a second aqueous system. The second aqueous system is then preferably treated with fresh baker's yeast or at least one second protease and maintained at a temperature ranging from about 50° C. to about 60° C. for a period of time ranging from about 48 hours to about 96 hours. The resulting material has little or no bacterial contamination and may be used in preparing hydrolyzed vegetable protein in accordance with this invention.

Preparation of Hydrolyzed Vegetable Protein

In one aspect, the invention includes a method of preparing hydrolyzed vegetable protein from proteinaceous vegetable material using commercial enzymes alone or preferably using combinations of commercial enzymes and fresh baker's yeast.

The proteinaceous vegetable material useful in the method of the invention may be a plant protein material including, but not limited to, soya, wheat germ, corn gluten, rice gluten, wheat gluten, potatoes, okra, alfalfa, oats, and the like, or may be a fermented protein koji prepared from the protein containing material and a carbohydrate. The carbohydrate may be, for example, wheat flour, roasted wheat or wheat bran. Seeds (such as sunflower, pumpkin, squash, poppy, sesame, flax, chia, celery, rapeseeds, cottonseeds, and caraway), leguminous seeds (such as peas, peanuts, beans, soybeans and lentils), nuts (such as walnuts, coconuts, pine nuts, cashew nuts, hickory nuts, chestnuts, almonds, brazil nuts and filberts), and grains (wheat, corn, oats, rye, rice and barley) are other proteinaceous vegetable materials that are useful within the methods of the invention.

According to a method of the invention, the proteinaceous vegetable material is sheared and dissolved or suspended in an aqueous solvent to form an aqueous system. Preferably, any insoluble material in the aqueous system is then removed by filtration, centrifugation or decantation.

The aqueous system is then treated in one embodiment with fresh baker's yeast and at least one fiber-hydrolyzing enzyme. The fresh baker's yeast is added to the aqueous system, and then the at least one fiber-hydrolyzing enzyme is added to the aqueous system. Alternatively, first the at least one fiber-hydrolyzing enzyme is added to the aqueous system, and then the fresh baker's yeast is added to the aqueous system.

Preferably the ratio of fresh baker's yeast-to-proteinaceous material will range from about 0.075:1 to about 0.75:1 since this unexpectedly affords hydrolyzed vegetable protein that has 5-50 times the amount of MSG obtained with a 1.1:1 yeast-to-proteinaceous material ratio, as previously reported in U.S. Pat. No. 2,536,171. In one embodiment, the ratio of fresh baker's yeast to proteinaceous vegetable material will range from about 0.075:1 to about 0.75:1. In another embodiment, the ratio of fresh baker's yeast to proteinaceous vegetable material will range from about 0.08:1 to about 0.5:1. In yet another embodiment, the ratio of fresh baker's yeast to proteinaceous vegetable material will range from about 0.1:1 to about 0.25:1. In still another embodiment, the ratio of fresh baker's yeast to proteinaceous vegetable material will be about 0.1:1. In a further embodiment, the ratio of fresh baker's yeast to proteinaceous vegetable material will be about 0.25:1.

Fresh commercial baker's yeast (Saccharomyces cerevisiae) having a moisture content of about 66 to 70% is preferred. For example, compressed Fleischmann's yeast, Lallemand's yeast or Red Star yeast may be used.

Without wishing to be bound by theory, the at least one fiber-hydrolyzing enzyme added to the reaction mixture is thought to hydrolyze the cell walls of the yeast and cause intracellular yeast peptidases and glutaminases to be released into the hydrolyzate to enhance the solubilization of the proteinaceous material.

The added fiber-hydrolyzing enzyme is an enzyme capable of hydrolyzing carbohydrates and fibers present in the vegetable material. In one aspect, this enzyme may be a carbohydrase. As used herein, the term "carbohydrase" means any enzyme that is capable of at least catalyzing hydrolysis of a carbohydrate-containing target substrate. By "hydrolysis" is meant enzymatic degradation of the carbohydrate-containing target substrate that includes complex carbohydrates like cellulose, hemicellulose, pectin, xylan chains of hemicellulose, and/or polymers of other 5-carbon sugars into their sugar components like pentoses or hexoses.

Cellulase is one carbohydrase that may be used in the methods of the present invention. More preferably, the cellulase should be substantially free of any microorganism when it is included as part of the aqueous enzyme composition. Cellulase may be derived from a number of different sources, such as fungal sources, plant sources, microbial sources, animal sources, or any combination of any of these.

Besides cellulase, other carbohydrases, such as hemicellulase, alpha-galactosidase, invertase, mannanase, beta-gluconase, beta-glucanase, arabanase, polygalacturonase, ferulic acid esterase, xylanase, beta-galactosidase, beta-fructofuranosidase, alpha-amylase, betaamylase, pectinase, pectin depolymerase, pectin methyl esterase, pectin lyase, glucoamylase, oligo-1,6-glucosidase, lactase, beta-d-glucosidase, or any combination of any of these are suitable additional non-exhaustive examples of carbohydrases that may be used separately or in combination with cellulase in accordance with the methods of the present invention.

Preferably, the aqueous carbohydrase enzyme component will include cellulase and any combination of hemicellulase, alpha-galactosidase, mannanase, beta-gluconase, beta-glucanase, arabanase, polygalacturonase, xylanase, beta-galactosidase, beta-fructofuranosidase, alpha-amylase, beta-amylase, pectinase, invertase, pectin depolymerase, pectin methyl esterase, pectin lyase, glucoamylase, oligo-1,6 glucosidase, lactase, or beta-d-glucosidase.

In one embodiment, a blend of cellulase and hemicellulase is used in the methods of the present invention. In another embodiment, a blend of cellulase, hemicellulase and pectinase is used in the methods of the present invention.

Some non-exhaustive examples of cellulases or carbohydrases that can be used in the present invention include Diastase 80 (Rohm & Haas Co.), Depol 40L (Biocatalyst Pte Ltd.), Celluclast (Novo Nordisk), Cellulase AP and/or Cellulase T (Amano Enzymes USA, Chicago, Ill.); Enzeco cellulase CEP and/or Enzeco cellulase CE-2 (Enzyme Development Corporation (EDC), New York, N.Y.); Cellulase 4000 or Crystalzyme Cran (Valley Research Inc., South Bend, Ind.); Viscozyme L, or Cellubrix, Peelzym, Gamanase 1.0L (Novozymes, Franklinton, N.C.); Multifect cellulases (Danisco, Calif.); or Rapidase tropical cloud, Cytolase PC15, Cytolase CL (Gist Brocades, N.J.). Some non-exhaustive examples of suitable pectinases include pectinase 500,000 AJDU/GM or pectinase 3,500 ENDO-PG/GM (Bio-cat), pectinase p-II (Amano Enzymes USA); or Multifect pectinase FE (Danisco). Suitable amylases for the present invention include Enzeco fungal amylase (EDC), amylase DS, Amylase S Amano, Amylase THS Amano, and Amylase AY Amano (Amano Enzymes USA).

Suitable alpha-galactosidases include α-d-galactosidase or α-d-galactosidase DS (Amano Enzymes USA), Enzeco alpha-galactosidase concentrate (EDC); and Validase AGS (Valley Research, Inc). Suitable hemicellulases that can be used in the present invention include Enzeco hemicellulase 20M (EDC); Hemicellulase Amano 90 (Amano Enzymes USA); and Multifect XL (Danisco).

When enzymes are used in accordance with the present invention, the enzymes may be applied in any form, such as a granular, concentrate, solid, paste, liquid, as a mist, in vapor form, or as part of the aqueous enzyme composition as noted above.

The concentration of the enzyme(s) in the added enzyme component may generally range from about 0.0001 weight % to about 99 weight %, based on the total weight of the enzyme component. The added enzyme component may optionally include sucrose, fructose, ash, alcohol, and any other components that are compatible with, and do not retard the biochemical rate of catalysis of the enzyme.

The hydrolysis reaction is maintained at a given temperature for a given amount of time sufficient to hydrolyze the proteinaceous material to the desired degree. The extent of hydrolysis may be determined by methods known to those skilled in the art, such as chromatographic methods. The flavor of the reaction mixture may also be sampled throughout the process, to ensure that the quality of the product is not compromised by insufficient or excessive hydrolysis.

Solubilization and Pasteurization

In another aspect, the invention includes a two-step method of solubilizing and pasteurizing proteinaceous vegetable material. In a non-limiting embodiment, the resulting solubilized and sterilized proteinaceous vegetable material may be used to prepare hydrolyzed vegetable protein (HVP).

In the first solubilizing step of the method, the proteinaceous vegetable material is treated with least one first heat-stable protease and maintained at a temperature ranging from about 60° C. (140° F.) to about 75° C. (167° F.) for a period of time ranging from about 3 hours to about 6 hours. In a non-limiting embodiment, in this step the proteinaceous material is at least partially liquefied.

In the second step of the method, the material is maintained at a temperature ranging from about 50° C. (122° F.) to about 60° C. (140° F.) for a given period of time ranging from about 48 hours to about 96 hours. Optionally, the material is further treated with fresh baker's yeast or at least one second heat-stable protease. In a non-limiting embodiment, in this step the proteinaceous material is further hydrolyzed. The resulting hydrolyzed material has good sensory properties and the bacterial contamination under the conditions of the method of the invention is minimal or non-existing.

The proteases used above may be enzymes produced during koji fermentation, proteolytic enzymes produced by lactic acid bacteria used to inoculate the protein material, technical proteolytic enzymes, or a combination thereof. The technical enzyme may be, for example, a protease (including endoproteases, exopeptidases, carboxypeptidases, aminopeptidases and endo- and exoproteases), peptidase or glutaminase (such as Flavorzyme™ Alcalase™, Dextrozyme™, and AMG™, all provided by Novo Nordisk Ferment AG, Dittigen, Switzerland). The term "technical enzymes" refers to the fact that these enzymes have been isolated and purified to remove interfering activities.

Suitable endoproteases can be obtained from animal, plant or microbial material. They include recombinant enzymes, eg., enzymes obtained by genetic engineering techniques. Preferred selective endoproteases, which have a preference for cleaving adjacent to certain amino acids, include trypsin (EC 3.4.21.4), elastase (EC 3.4.21.36), chymotrypsin (EC 3.4.21.1), thermolysin (EC 3.4.24.27), prolyl oligopeptidase (EC 3.4.21.26), glutamyl endopeptidase I (EC 3.4.21.19), microbial collagenase (EC 3.4.24.3), peptidyl-Asp metallopeptidase (EC 3.4.24.33), glycyl endopeptidase (EC 3.4.22.25), saccharolysin (EC 3.4.24.37), neutral protease (EC 3.4.24.28), streptogrisin B (EC 3.4.21.81), glutamyl endopeptidase 11 (EC 3.4.21.82), engineered proline-specific petidyl-prolyl cis-trans isomerases and enzymes with rennet-like specificity, for example microbial rennet, eg. Mucor pepsin (EC 3.4.23.23). Preferred non-selective endoproteases, which do not have a strong preference for cleaving adjacent to specific amino acids, but which cleave almost adjacent to a selected group of amino acids, include for instance subtilisin (EC 3.4.21.14) and papain (EC 3.4.22.2).

Suitable exopeptidases (or exoproteases, the terms are interchangeable) can include carboxypeptidases and/or aminopeptidases. These exoenzymes can be obtained from animal, plant or microbial material. They include recombinant enzymes, eg. Enzymes obtained by genetic engineering techniques.

Preferred selective carboxypeptidases which have a preference for cleaving adjacent to certain amino acids, include carboxypeptidase B (EC 3.4.17.2), CPD-1 (pep G) and CPD-II (pep F) from *A. niger* (Degan et al, Appl. Environ Microbiol, 58(7):2144-52, 1992).

Preferred non-selective carboxypeptidases, which do not have a strong preference for cleaving adjacent to certain amino acids but cleave almost adjacent to any amino acid residue, include CPD-Si, from *P. janthinellum* and CPD-Y from *S. cerevisae* (Dal Degan, et al, Appl. Environ Microbial, 58(7):2144-52, 1992).

Preferred selective aminopeptidases, which have a preference for cleaving adjacent to certain amino acids, include prolyliminopeptidase (EC 3.4.11.5), bacterial leucyl aminopeptidase from *Aeromonas proteolytica* (EC 3.4.11.10) or leucyl aminopeptidase from *Aspergillus* species, and methionyl aminopeptidase (EC 3.4.11.18) and the phenylalanine specific aminopeptidases as described in EP773990.

Preferred non-selective aminopeptidases, which do not have a strong preference for cleaving adjacent to certain amino acids, but which cleave adjacent to almost any amino acid, include thermophilic aminopeptidase (EC 3.4.11.12).

Preferred combinations of endo- and exoproteases include: (a) streptogrisin B or trypsin or papain endoprotease with CPD II (to release Arg or Lys); (b) chymotrypsin or thermolysin or neutral protease with CPD I (to release Tyr, Phe or Trp); (c) thermolysin or neutral protease with bacterial leucyl aminopeptidase or leucyl aminopeptidase from *Aspergillus* (to release Leu, He, Phe or Val); (d) neutral protease or subtilisin with CPD I (to release Phe or Ala); (e) elastase with CPD I (to release Ala); (f) rennet-like proteases with or leucyl aminopeptidase from *Aspergillus* or methionyl aminopeptidase (to release Met); and (g) engineered proline-specific peptidyl-prolyl cis trans isomerase (cyproase) with prolyl amino peptidase (to release Pro); (h) proline specific endoprotease with malt enzymes or CPD-Y (to release Pro); and (i) glutamyl endopeptidase with CPD-1 (to release Glu).

Those skilled in the art will recognize, or be able to ascertain numerous equivalents to the specific procedures, embodiments, claims, and examples described herein using no more than routine experimentation. Such equivalents are considered to be within the scope of this invention and covered by the claims appended hereto. For example, it should be understood, that modifications in reaction conditions, including but not limited to reaction times, reaction size/volume, and experimental reagents, such as solvents, catalysts, pressures, atmospheric conditions, e.g., nitrogen atmosphere, and reducing/oxidizing agents, with art-recognized alternatives and using no more than routine experimentation, are within the scope of the present application.

It is to be understood that wherever values and ranges are provided herein, all values and ranges encompassed by these values and ranges, are meant to be encompassed within the scope of the present invention. Moreover, all values that fall within these ranges, as well as the upper or lower limits of a range of values, also fall within the present application.

The following examples further illustrate aspects of the present invention.

EXAMPLES

The invention is described hereafter with reference to the following examples which illustrate aspects of the present invention. The examples are provided for the purpose of illustration only and the invention should not be construed as being limited to these examples, but rather should be construed to encompass any and all variations that become evident as a result of the teaching provided herein.

Materials

Unless specifically indicated, the reagents and materials described herein were purchased from commercial sources and used without further purification.

Exemplary Process of Making Hydrolyzed Vegetable Protein

Example 1

FIG. 1 is a flow diagram illustrating a representative method by which a proteinaceous vegetable flavor enhancer may be prepared in accordance with embodiments of the invention. Thus, referring to this FIGURE, a plant protein material like wheat gluten 10 is sheared in a high shear liquefier 12. The sheared material is then transferred to a batching tank 14. Both water 16 and an endoprotease 18 such as Alcalse are added to the batching tank which is maintained at about 70° C. (158° F.) for about three hours to kill any bacteria present and to solubilize the wheat gluten and increase yield in the final product. Heating up to about 90° C. (194° F.) may be used to reduce the heating time to as little as ½ hour.

The batch treated material is then optimally passed through a heat exchanger 20 to raise the temperature of the mixture to about 100° C. (212° F.) for about 10 minutes after which is cooled down to about 55° C. (131° F.) as it is transferred into a hydrolysis tank 22. An exopeptidase 24 such as Flavorzyme, as well as baker's yeast 26, and a carbohydrase 28 such as Viscozyme are added to the hydrolysis tank. The material in this tank is heated for about 62 hours at 55° C. (131° F.). It is believed that the Viscozyme hydrolyzes the cell walls of the yeast causing intracellular yeast peptidases and glutaminases to be released into the hyrdrolyzate to enhance the desired hydrolysis.

When the hydrolysis step is completed, the material optimally passes through a heat exchanger 28 over a period of about 20 minutes to raise its temperature to about 90° C. (194° F.) whereupon it enters a holding tank 30.

At the appropriate time, the material in the holding tank is transferred to a conventional filtration/clarification unit 34. The resulting filtrate 36 is transferred to a conventional evaporation unit 38 which removes a portion of the remaining water in the filtrate. This material is then subjected to spray drying in a conventional spray drying unit 40 to produce a final dried proteinaceous vegetable protein enhanced/product 42.

Example 2

Effect of Yeast-to-Protein Ratio on the Process of Making Hydrolyzed Vegetable Protein The effect of the yeast-to-protein ratio on the quality and yield of hydrolyzed vegetable protein (HVP) obtained from the fermentation of protein material was investigated by systematically varying the yeast-to-protein ratio in the starting reaction mixture, as well as using different materials (wheat gluten or soy protein) as the sources of protein. The results of these studies are summarized in Table 1 below, including the yield of MSG and HVP observed for each reaction, and a description of the flavor of the final product.

TABLE 1

| Batches | yeast | protein source wheat gluten | protein source soy protein | MSG (%) | yield (%) | flavor description |
|---|---|---|---|---|---|---|
| A | 0 | 25 | | 4.92 | 76 | MSG content is low |
| B | 0 | 30 | | 5.72 | 59.6 | light umami, MSG is low |
| C | 0.1 | 0.428 | | 7.59 | 69 | umami is good but weaker than batch E |
| D | 0.1 | 0.9 | | 9.47 | 76 | very good umami |
| E | 0.1 | 1.2 | | 7.44 | 67.8 | good umami |
| F | 0 | | 22.5 | 1.22 | 34 | |
| G | 0 | | 25 | 1.64 | 54.5 | |
| H | 0.1 | | 0.8 | 3.05 | 66 | good sensory character; hard to tell the product is made from soy |

As illustrated in Table 1, in batches A, B, C, D and E wheat gluten was used as the protein source. No yeast was added to batches A and B, and the MSG yield measured for these two batches was close to 5% (4.92% and 5.72%, respectively). The umami for batch B was found to be light. A ratio of yeast-to-protein of 0.1:0.428 (or 0.23:1) was used in batch C, resulting in an increased MSG yield of 7.59% and HVP yield of 69%. There was also an improvement in umami in this batch in comparison to batch B. A lower ratio of yeast-to-protein was used in batch D (0.1:0.9, or 0.11:1), resulting in even higher yields of MSG (9.47%) and HVP (76%) and a good umami. A further decrease in the yeast-to-protein ratio in batch E (0.1:1.2, or 0.08:1) produced similar yields of MSG and HVP, and the umami was found to be good overall.

As illustrated in Table 1, batches F, G and H used soy protein as the protein source. No yeast was added to batches F and G. The MSG yield measured for these two batches was low (1.22% and 1.64%, respectively). A ratio of yeast-to-protein of 0.1:0.8 (or 0.12:1) was used in batch H, resulting in a doubling of MSG yield (3.05%) and improvement of HVP yield (66%) over yeast-free batches EVP22 and EVP23. Batch H yielded material with good sensory character.

The experiments summarized above using either wheat gluten or soy protein as the protein source are consistent with the finding that optimal MSG and HVP yields, as well as good flavor, may be obtained by employing a yeast-to-protein ratio ranging from about 0.075:1 to about 0.75:1.

Example 3

Pretreatment to Control Bacterial Contamination

A two-step procedure for pre-treating the proteinaceous vegetable material to achieve pasteurization was investigated by varying the temperature (temp1) and duration of heating (t1) of the first step, and the temperature (temp2) and duration of heating (t2) of the second step. The pre-treatments were run in the presence or absence of a preservative (sodium benzoate), and contamination of the final product was evaluated. The results are summarized in Table 2 below. The test method, which was directed to determining total aerobic bacteria at mesophillic temperatures (35 C.°) was carried out using an incubator set at 35 C.°±1 C.°, using Petrifilm AC plates. Samples were prepared using a general dilution procedure. The top film of the Petrifilm AC plate was lifted and 1 ml of sample was pipetted onto the center of the bottom film. The top of the film was released down onto the inoculum. A spreader (recessed side down) was placed on the top film over the inoculum and pressure applied to the center of the spreader to distribute evenly. Then the spreader was removed and the inoculum was left undisturbed for 1 min.

The plates were incubated at 35°±1° C. for 24±3 hr with the clear side up in stacks of not more than 20. If a product looked suspect in terms of exhibiting higher than normal counts, the plate was allowed to incubate 48±3 hr. The number of colonies on the plates (which appeared as red dots) were counted and recorded.

The plate count was determined by selecting the average counts obtained on plates made with the highest dilution that provided 25-250 colonies. In most cases there was only the 1:100 plate. The count on the 1:100 plate was multiplied by 100 to get the final count. If there were more than 25 colonies, that number was multiplied by the dilution factor and recorded. If the number of colonies on the plate was too numerous to count and there was no chance that a second sample could be obtained, one square cm was counted and multiplied by the square area of the plate (for Petrifilm plates multiply by 20), then by the dilution factor. If there were too many colonies to count in one square, the value was recorded as greater than 1,000,000.

Everything that was a microbiological colony was counted including any yeast or molds. Particles that looked like product were not counted. The bacteria typically had round or lobed, not rough jagged edges. On Petrifilm plates the colonies appeared as red dots. Colonies may spread to cover the whole plate were counted as one colony.

TABLE 2

| EVP | temp1 | t1 | temp2 | t2 | sodium benzoate added | contamination |
|---|---|---|---|---|---|---|
| 1 | 55 | 2 | 45 | 71 | no | yes: putrid |
| 2 | 65 | 2 | 45 | 71 | yes | no |
| 3 | 60 | 3 | 50 | 48 | yes | no |
| 5 | 50 | 5 | 60 | 64 | yes | yes: putrid |
| 6 | 65 | 5 | 50 | 48 | no | no: high (but not problematic) bacteria count (<10$^6$) |
| 7 | 65 | 5 | 50 | 48 | no | no: high bacteria count |
| 9 | 65 | 4 | 60 | 64 | no | no: low bacteria count |
| 13 | 65 | 5 | 55 | 43 | no | no: low bacteria count |
| 14 | 65 | 5 | 55 | 67 | no | no: low bacteria count |
| 17 | 65 | 5 | 55 | 91 | no | no: low bacteria count |
| 22 | 70 | 3 | 55 | 45 | no | no: low bacteria count |

As illustrated above, in batches EVP 1 and EVP5 low temperatures were used in the first step (temp 1 of 55° C. and 50° C., respectively) and the final material was found to be putrid. In the remaining batches, the temperature of the first step was kept at 60° C.-70° C. and no putrification was observed.

The bacteria count of the final product was found to be influenced by the temperature maintained in the second step of the process. As illustrated in Table 2, batches EVP6 and EVP7 were kept at 50° C. (122° F.) in the second step of the process and showed high bacteria counts. On the other hand, batches EVP9, EVP13, EVP14, EVP17 and EVP22 were kept at 55-60° C. (131-140° F.) in the second step of the process and showed low bacteria counts.

The disclosures of each and all patents and patent applications cited herein are hereby incorporated herein by reference in their entirety.

While the invention has been disclosed with reference to specific embodiments, it is apparent that other embodiments and variations of this invention may be devised by others skilled in the art without departing from the true spirit and scope of the invention. The appended claims are intended to be construed to include all such embodiments and equivalent variations.

What is claimed:

1. A method of preparing hydrolyzed vegetable protein, comprising the steps of:
    (a) providing a first aqueous system comprising a vegetable material;
    (b) treating the first aqueous system with a first protease comprising a combination of a fungal protease/aminopeptidase preparation from *Aspergillus oryzae* and a bacterial endoprotease preparation from *Bacillus licheniformis* and maintaining the first aqueous system at a temperature ranging from about 60° C. to about 75° C. for a period of time ranging from about 3 hours to about 6 hours to generate a second aqueous system;
    (c) treating the second aqueous system with fresh baker's yeast having a moisture content of about 66-70% wherein the ratio of the yeast to the vegetable protein ranges from about 0.075:1 to about 0.5:1; and,
    (d) maintaining the second aqueous system at a temperature ranging from about 50° C. to about 60° C. for a period of time ranging from about 48 hours to about 96 hours, wherein the monosodium glutamate yield of the resulting solubilized and pasteurized proteinaceous vegetable material is from about 3% to about 10%.

2. The method of claim 1, wherein the vegetable protein comprises soy protein, wheat germ, corn gluten, rice gluten or wheat gluten.

3. The method of claim 1, wherein the first aqueous system is also treated with at least one fiber-hydrolyzing enzyme which may be a carbohydrase.

4. The method of claim 3, wherein the carbohydrase is selected from the group consisting of cellulase, hemicellulase, alpha-galactosidase, invertase, mannanase, beta-gluconase, beta-glucanase, arabanase, polygalacturonase, ferulic acid esterase, xylanase, beta-galactosidase, beta-fructofuranosidase, alpha-amylase, betaamylase, pectinase, pectin depolymerase, pectin methyl esterase, pectin lyase, glucoamylase, oligo-1,6-glucosidase, lactase, beta-d-glucosidase, and a combination thereof.

5. The method of claim 1, wherein the first protease includes a glutaminase.

6. The method of claim 1, wherein following maintaining the first aqueous system at a temperature ranging from about 60° C. to about 75° C. for a period of time ranging from about 3 hours to about 6 hours to generate a second aqueous system the temperature of the second aqueous system is raised to about 100° C.

7. The method of claim 1, wherein following maintaining the second aqueous system at a temperature ranging from about 50° C. to about 60° C. for a period of time ranging from about 48 hours to about 96 hours the temperature of the second aqueous system is raised to about 90° C.

8. The method of claim 1, wherein the ratio of the yeast to the vegetable protein ranges from about 0.08:1 to about 0.5:1.

* * * * *